May 1, 1923. 1,453,716
C. F. MacGILL
FLUID REGISTERING MECHANISM
Filed Aug. 16, 1921
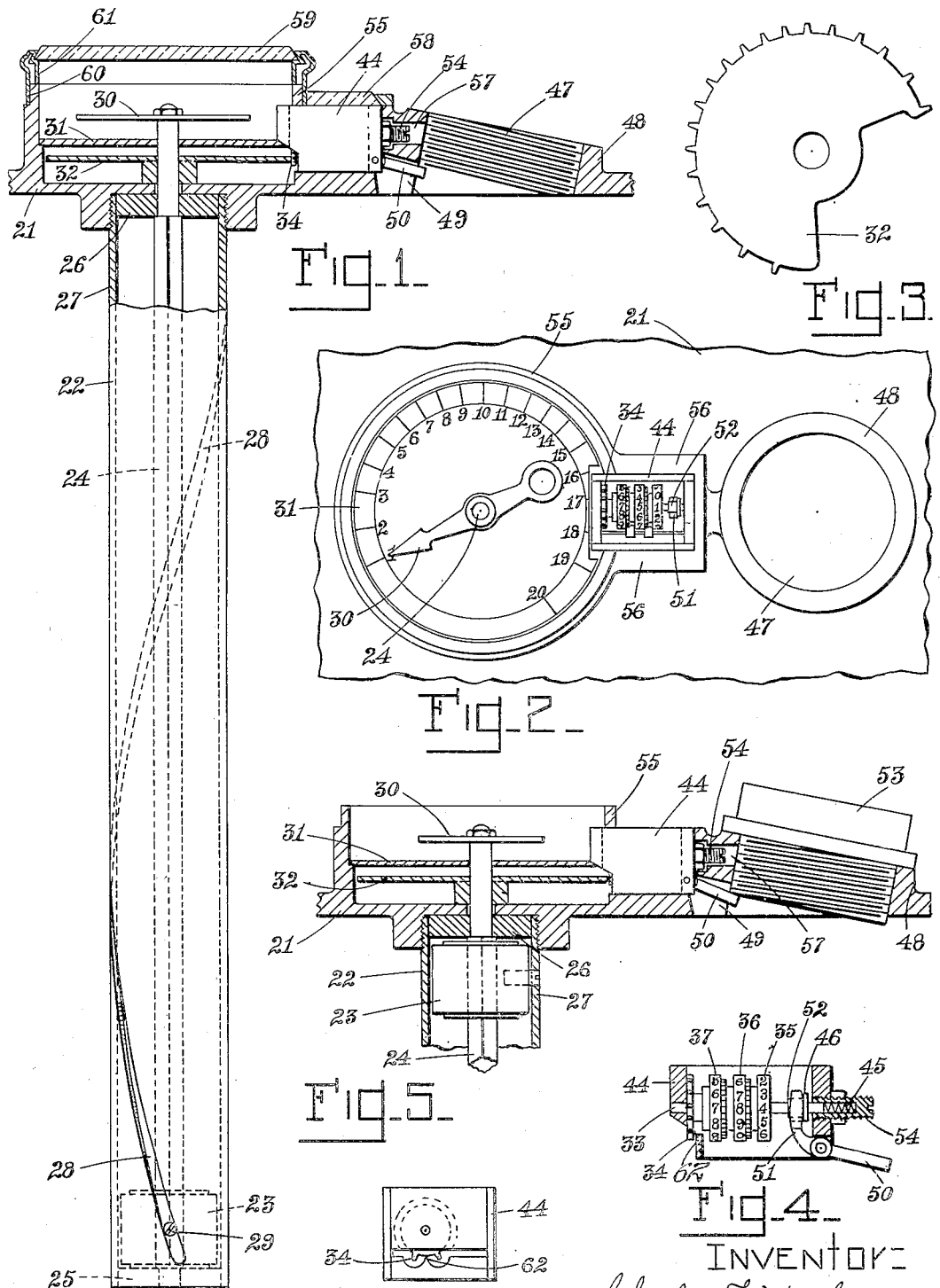
INVENTOR:
Charles F. MacGill
by Macleod, Calvin, Copeland & Dike
Attys.

Patented May 1, 1923.

1,453,716

UNITED STATES PATENT OFFICE.

CHARLES F. MacGILL, OF CAMBRIDGE, MASSACHUSETTS.

FLUID-REGISTERING MECHANISM.

Application filed August 16, 1921. Serial No. 492,818.

*To all whom it may concern:*

Be it known that I, CHARLES F. MACGILL, a citizen of the United States, residing at Cambridge, county of Middlesex, State of Massachusetts, have invented a certain new and useful Improvement in Fluid-Registering Mechanism, of which the following is a specification, reference being had therein to the accompanying drawings.

The invention relates to a new and useful improvement in automatic registering mechanism for a fluid container.

One object of the invention is to provide an attachment for a fluid container to register the amount of fluid that has been measured into the container and to add the amount introduced at any one filling operation to the amount of fluid that has previously been measured into the container, whether the previous amount has been withdrawn or not from the container, so that the device will at all times indicate the sum of the amounts previously introduced added to that last introduced, thereby indicating at the time of observation the total amount that has up to that time passed into the container irrespective of the amount that has been drawn out.

The invention is especially intended for application to a liquid fuel tank, such for instance as the fuel tank of an automobile, but is not limited to such use. It has been common heretofore to have an attachment controlled by a float to indicate the quantity of actual liquid contents of the tank at any particular time, so that the chauffeur can tell how much gasoline there is in the tank and thereby know when it should be replenished, and it will also indicate the total amount actually in the tank after it has been replenished, but so far as I am aware there has not been provided any means by which there is registered the total amount of a succession of replenishments.

It has been found that dishonest chauffeurs, or other employees, sometimes misrepresent to the employer the amount of gasoline which they have purchased and have charged up to the employer more than they have actually paid for. Unless the employer looks at the gauge himself immediately before and after the tank has been filled, he has no means of verifying the truth of the employee's statement so far as the gauge shows.

One object of the present invention is to provide a registering device by which if the employer examines the register of his automobile before it starts out on a trip and then examines it again after its return, or at any later date, he can tell absolutely how much has been added to the tank during the interval, whether by a single replenishment or by numerous replenishments regardless of the amount that may be withdrawn in the meantime.

The invention will be fully understood from the following description when taken in connection with the accompanying drawings, and the novel features thereof will be pointed out and clearly defined in the claims at the close of this specification.

In the drawings, Fig. 1 is an elevation partly in section of a device embodying the invention, the filler cap being removed and the float in its lowermost position as when the tank is empty or nearly so.

Fig. 2 is a plan view of the parts shown in Figure 1, the glass cap over the dial and counter being removed.

Fig. 3 is a detail view of the sector gear.

Fig. 4 is a vertical section of the counter mechanism.

Fig. 5 is a view of the part shown in Figure 1, the lower portion broken away and showing the filler cap in place, and the counter pinion disengaged from the sector gear, and showing the float at the top as when the tank is full.

Fig. 6 is a detail view showing the means for locking the counter.

Referring now to the drawings, at 21 is shown a portion of the top of a fuel tank having attached thereto the cylinder 22 within which is a float 23. The cylinder is shown with its upper end screwed into the top of the tank and its lower end extending down into the tank nearly to the bottom, as is usual with devices of this character. The float 23 is slidably mounted on a rotatable rod or shaft 24. Said shaft 24 is noncircular, preferably square in cross section for the purpose to be hereinafter described. The lower end of the said shaft is formed with a reduced cylindrical portion which is journalled in a bearing member 25 attached to the lower end of the cylinder. The upper end of the shaft is also formed with a reduced cylindrical portion which is journalled in a bearing member 26 in the head 27 of the cylinder 22. The bearing member 25 for the lower end of the shaft serves also as a bottom rest for the float 28 when the contents of the tank are reduced enough to allow the float to come to the bottom.

The float is freely slidable on the shaft, the cylinder is formed with a spiral slot 28 which goes not more than once around the periphery of the cylinder. As shown it goes somewhat less than once around. A pin 29 projects from the float and engages with said slot 28.

As the float rises and falls it slides up and down on the shaft and at the same time it is rotated by reason of the engagement of the pin 29 with the spiral slot.

By reason of the noncircular contour of the shaft which passes loosely through the noncircular hole in the float, the rotation of the float will cause the shaft also to rotate simultaneously therewith.

The upper end of the shaft 24 extends up through the upper bearing member 26 and carries at its upper end an index hand 30 which moves around with the rotation of the shaft.

A dial 31 is provided, which is properly marked with graduations to which the index hand will point as it moves around. The dial is properly graduated and marked so that as the float rises when the tank is being filled the hand will indicate the number of gallons or other units of measure in the tank. In the drawings the device is shown as adapted to use with a 20 gallon tank. The mechanism for registering the total of a continued series of fillings or replenishings which constitute the invention will now be described.

Mounted on the shaft 24, preferably below the index hand 30 is a gear 32 which contains as many teeth as the number of gallons or other units of measure indicated on the dial, or according to the capacity of the tank. The numbers on the dial as well as the teeth on the gear are farther apart at the ends than in the middle, by reason of the fact that the particular device shown is intended for use with a cylindrical tank lying in a horizontal position, consequently the float has to rise farther for a gallon at the bottom and top than in the middle; that is, the less the surface area of the level of the liquid, the greater distance the float will rise for each gallon, so that the gradations are of increasing distance apart on each side of the center. The gear shown is a segment gear, as the gear does not make a full rotation while the float is rising from the bottom to the top in the form illustrated in the drawings.

A rotary shaft 33 is journalled in suitable bearings and has mounted thereon a pinion wheel 34 having teeth which are engaged by the teeth of the gear 32, whereby the shaft 33 is rotated as the gear 32 rotates. Mounted on the shaft 33 are a series of number counting wheels, 35, 36, 37, the wheel 35 being a unit wheel, the wheel 36 being for tens, and the wheel 37 for hundreds. The unit wheel revolves once at each rotation of the shaft and means are provided in well-known manner whereby at each complete rotation of the unit wheel, the tens wheel will be rotated through a single step, making one complete rotation for every ten revolutions of the unit wheel, and in a similar manner the hundreds wheel is turned one notch at each complete rotation of the tens wheel.

This transfer mechanism is well known, and it is not deemed necessary to describe it in detail. Of course, the numbering wheels may, if desired, be increased to thousands and tens thousands.

The shaft 33 is journalled in a frame or box 44. Said shaft 33 is axially slidable a limited distance in its bearings, the number of wheels being mounted thereon so as to at all times maintain their relation to each other. The end of the casing or box toward the gear wheel 32 is slotted near the bottom so that the teeth of the pinion 34 may be engaged by the teeth of the gear 32.

A spring 45 in the journal bearing 54 holds the shaft 33 in position for the pinion 34 to be engaged by the teeth of said gear 32 when free to do so, but the shaft 33 is capable of being moved endwise so as to withdraw the shaft and the pinion 34 from engaging position relative to the gear 32, and of being locked in such disengaging position. The purpose of this is to prevent the shaft 32 and pinion 34 and number wheels from being rotated backwards when the float descends while the fuel is being consumed. It should only move forward while the tank is being filled. The gear 32, however, should be free to not only rotate forward when the tank is being filled to indicate the increasing amount of fuel as it is being filled, but also to rotate backwards and turn the index hand backward to indicate the reduction in the fuel.

After the tank has been filled and the amount transferred to the numbering wheels, the numbering wheels should be locked against rotation either forward or backward, and this is accomplished by sliding the shaft 33 out of engaging position with relation to the gear wheel 32 and maintaining it in this disengaged position. The means which I have provided are as follows:—

The filling opening 47 of the tank is surrounded by a curb 46. The curb is formed with a slot 49 in the side toward the box 44 in which the shaft 33 is journalled. A lever 50 is pivoted in the end wall of the box 44 and has an upwardly turned forked arm 51 whose branches 52 straddle the shaft 33 and are adapted to engage a collar 46 on said shaft. The long arm 50 of said lever extends through the slot 49 in the wall of the curbing and projects slightly into the interior of the filler opening. The filler opening is closed at the top by a screw cap 53 which has a threaded exterior peripheral portion which screws into the threaded inner periphery of the curbing 48. When the cap is screwed down, its lower edge engages with the inwardly projecting end of the long arm of the lever 50 and turns it downward on its pivot far enough to cause the forked portion 52 to slide the shaft 33 to the right, as viewed in the drawings, and thereby withdraw the pinion 34 from engagement with gear 32. At the same time, stop 62 engages between the teeth of the pinion 34 and locks it against rotation from operative relation to the gear 32. The pressure of the forked arm 52 compresses the spring 45 so that when the cap is unscrewed, the spring 45 will push the shaft 33 to the left to again bring pinion wheel 34 into operative relation to the gear 32. The cap will be unscrewed only when it is desired to add more fuel to the tank. The spring 45 is held in the journal bearing 54 which is screwed into the right-hand wall of the box, and is adjustable to vary the power of the spring.

The top of the tank is formed with a curbing or boxing 55 around the large toothed gear, and a recess having walls 56 opens out of one side of the curbing 55. The box in which the shaft 33 and the number wheels are located fits into said recess. The screw bearing 54 projects into a hole 57 in the curb 48. The box is also preferably provided with a glass cover 58 which is held by the enclosing walls 56 of the recess through which to read the top number on the numbering wheels which gives the correct registration.

The curb 55 is provided with a cover 59 having a glass top. Preferably, the cover has two downwardly extending annular concentric flanges 60, 61, the flange 61 being of less peripheral diameter than the flange 60, and with an annular space between the two flanges equal to the thickness of the wall of the curbing 48 so as to embrace the curbing between the two flanges.

What I claim is:—

1. In combination with a fluid container, a rotary shaft having indicator means controlled by the rotation of said shaft, said shaft being axially slidable, a float in said container, intermediate mechanism, whereby the rising of the float causes said shaft to rotate, said container having a filling opening, a cap for said filling opening, and means actuated by the closing down of the cap to move said shaft axially out of operative relation to the rotating mechanism therefor.

2. In combination with a fluid container, a rotary shaft having indicator means controlled by the rotation of the shaft, said shaft being axially slidable, a float in said container, intermediate mechanism, whereby the rising of the float causes said shaft to rotate, said container having a filling opening, a cap for said filling opening, means actuated by the closing down of the cap to move said shaft axially out of operative relation to the rotating mechanism therefor, a pinion on said shaft, and a catch which is engaged by the teeth of said pinion to positively lock said shaft against rotation when the said shaft has been axially moved out of operative relation to said rotating mechanism.

3. In combination with a fluid container having a filling opening, a cap for said opening, a rotary shaft having indicator means controlled by the rotation of the shaft, said shaft being axially slidable, means whereby the rising of fluid in the container causes the rotation of said shaft, means actuated by the closing down of said cap to move said indicator shaft axially out of operative relation to the mechanism for rotating said shaft, and means for automatically and positively locking said shaft against rotation when it is moved out of operative relation to its actuating mechanism.

In testimony whereof I affix my signature.

CHARLES F. MacGILL.